July 26, 1938.   H. SCHÜLLER ET AL   2,124,636
METHOD OF AND APPARATUS FOR MANUFACTURING RUBBER THREADS
Filed July 18, 1934
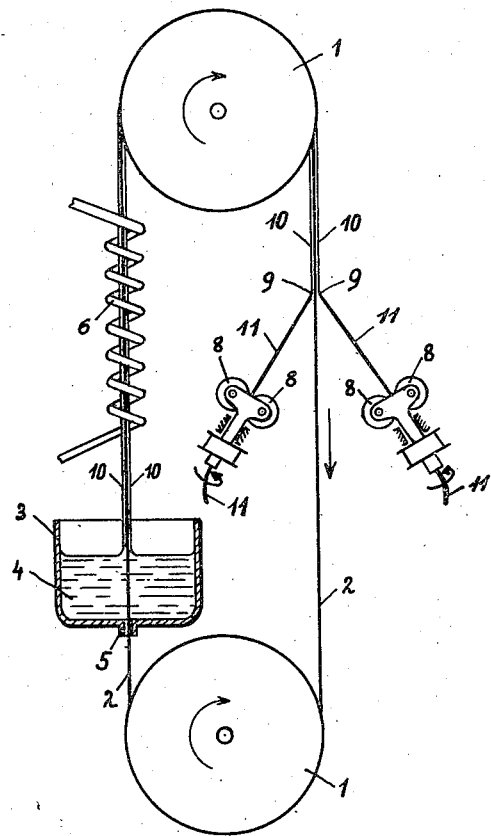
Inventors,
Hans Schüller, Emil Matzner,
Armand Kailich.
By their Attorneys,
Fraser, Myers & Manley.

Patented July 26, 1938

2,124,636

UNITED STATES PATENT OFFICE 2,124,636

METHOD OF AND APPARATUS FOR MANUFACTURING RUBBER THREADS

Hans Schüller, Emil Matzner, and Armand Kailich, Vienna, Austria, assignors to United States Rubber Products, Inc., New York, N. Y., a corporation of Delaware Application July 18, 1934, Serial No. 735,746
In Austria August 1, 1933

18 Claims. (Cl. 117—21)

The invention relates to a method of and apparatus for manufacturing rubber threads, especially to threads of round section from rubber strips or tapes.

The invention consists in that, in a continuous working process, there is first produced, from a rubber containing solution or mixture, preferably an aqueous rubber dispersion, in an endless manner of rubber strip of a filmy nature with a width corresponding to the thickness of the thread, and this endless produced strip is continuously fed up to a twisting device, the production of the rubber tape preferably being effected on moving supports (bands, belts and the like). By the fact that in the process according to the invention rubber strips are produced which have a width directly yielding or twisting the desired thread thickness and that according to the invention by means of moving carrier bands as supports which have the same width as the rubber strip to be manufactured, the advantage is attained that rubber strips with particularly advantageous cross-section with sharp, particularly thin and straight edges and with constant width are subjected to the production of the thread, and, therefore, threads of continuously equal strength or thickness are obtainable.

According to a preferable modification of the method the rubber strip to be twisted is produced on carrier tapes as supports moving upwards or downwards, preferably at least during, or immediately after, the taking up of the rubber-dispersion. By upwards-moving of the endless bands in a vertical or inclined direction the advantage is attained that rubber strips can be formed of great uniformity, this uniformity being automatically achieved by the flowing off of the dispersion in the longitudinal direction of the carrier tape under the action of gravity.

According to the invention the method is carried out in such a manner that the rubber strip is twisted in a state only so far dried, or dried and vulcanized, that it will still be sufficiently tacky or sticky and, thereby, the turns are reliably and firmly united by the twisting and cannot come open any more. Only after it has left the twisting devices, is the already formed thread completely vulcanized.

The vulcanization of the rubber strip can be effected not only by thermic action but also in a known manner by chemical action, but in any case may only be carried to such a point that the rubber strip still retains sufficient adhesive power to ensure that in the twisting the contacting surfaces of the strip material are reliably united into a round thread.

In the process according to the invention such travelling endless carrier bands may be used in a particularly advantageous manner to form the rubber strips or films on both sides of the carrier, and the carrier bands may be also passed directly through the rubber dispersion or the like, whereby the carrier band takes along the dispersion simply by adhesion.

It goes without saying that in the method according to the invention the application of the rubber dispersion to the conveyor band can also be effected in any other manner, for example by means of dipping wheels, by spraying, by feeding through nozzles and the like.

In all cases the application of the rubber dispersion or the like on to the carrier may be accelerated by the employment of the electro-cataphoretic effect, known per se.

It is preferable to employ, as the dispersion a self-vulcanizing mass, and to perform the vulcanizing process by drying the rubber strip during its conveyance on the carrier band. Thus, in carrying out the process, the conveyor band is for example caused, on emerging from the dispersion tank to traverse the drying device disposed at a certain distance corresponding to a uniform flowing off of the rubber layer and preferably arranged to surround the band.

The method according to the invention is best carried out by a twisting device consisting of two rolls or discs driven in opposite directions rotating, in addition, about the axis of the twisted thread, which rolls strip the rubber strip to be twisted off in an oblique direction from the support (carrier band) under suitable tension, and twist it so that a thread with a round section is formed, the rolls thereby exerting a radial clamping pressure on the ready twisted thread taken up between them. The rubber strip, according to the invention, is transformed into a thread by the application of tension, preferably with a higher degree of twisting than would be necessary for the purely geometrical forming of the thread, the thread, thereby, moreover experiencing a radial pressing by the two rolls of the twisting device, preferably pressed together by means of strong springs.

In order to be able to correctly choose in each case the tension to be exerted on the rubber strip and the degree of excessive twisting, the ratio between the speed of transport of the carrrier band and the pulling speed or the number of revolutions of the twisting devices must be variably adjustable.

The winding-up, however, cannot be effected in the usual manner by simply winding-up on a spool or reel, if it is required that no torsion stress shall remain which would become free again in un-winding the thread and cause the forming of loops. Since the rubber strip, on being twisted, is rolled-in, and the individual windings, thereby, are stuck together and do not become loose any more, it is necessary for avoiding the just mentioned drawback that the ready formed thread, on being wound up, experiences a continuous rotating around its longitudinal axis, and that with a number of revolutions which corresponds to the number of windings stuck together. It is, thereby, of no importance at all if the twisting device is running with a higher number of revolutions for the purpose of obtaining a tighter sticking-together of the windings of the thread, since any excessive twisting surpassing the twisting required for the sticking together of the thread is automatically eliminated in the longitudinal movement of the thread after leaving the twisting device; any portion of the thread twisted in advance of the twisting device beyond the sticking-twisting compensating this excessive twisting—which is not internally bound as the sticking-twisting but is elastically reversible—immediately after passing the twisting device by the equally great counter-twisting taking place after the twisting device.

For carrying out the method according to the invention a device is suitable in which endless bands serving as supports or carriers for the forming of the rubber strip are continuously passed upwards or downwards through a tank containing the dispersion or the like, the portion of the carrier band leaving the tank passing a drying or vulcanizing device and thereupon being carried on to the twisting devices.

The arrangement according to the invention is preferably such that on each side of the carrier band one twisting device is disposed so that the rubber strips formed on both sides of the carrier band are withdrawn each from one of these twisting devices.

The thread material running on to the winding device is left to stand, in the case of self-vulcanizing material, or is placed in a drying oven for the purpose of accelerating the final vulcanization.

The thickness of the rubber thread produced can be varied either by altering the concentration of the rubber dispersion or by altering the speed of the transport of the carrier through the device, whereby in both cases the thickness of the rubber film on the carrier band is correspondingly influenced.

In the accompanying drawing an example of an arrangement for the carrying out of the method according to the present invention is diagrammatically shown. Over the discs or drums 1, which rotate in the same direction, there is taken the endless carrier band 2. The container 3 shown is filled with self-vulcanizing rubber dispersion 4, and provided at the bottom with a slot 5 which permits of the liquid-tight passage therethrough of the carrier band. After emerging from the rubber dispersion 4, the band 2 travels through the drying device 6, and then comes with the film coatings 10 on each side to the twisting devices with the grooved discs 8 which detach the film strips 10 from the carrier band 2, at 9, and twist the same to such an extent that they enter as round threads 11 between the rotating grooved discs. The running off, the spooling, and the further vulcanizing of the thread is then effected in the general manner already specified.

The aperture in the bottom of the dispersion container through which the carrier band runs from below is provided with a suitable packing, for example of felt, rubber or the like. This packing clings perfectly tight to the band and, at the same time, effects the wiping of the band before its entry into the dispersion. The packing pieces are inserted in recesses provided in the container.

What we claim is:

1. A process of producing threads of rubber and the like of substantially circular cross-section in a continuous manner, which comprises depositing on opposite sides of a moving carrier band, rubber of the same width as the carrier, stripping the rubber from the opposite sides of the carrier and subjecting said stripped rubber bands to independent twisting operations to form separate threads.

2. Apparatus for producing threads of rubber and the like, comprising a reservoir for a rubber-containing fluid, a carrier band, means for moving said carrier band through the reservoir, and means for stripping a deposited rubber strip from the carrier band and twisting it into a circular thread.

3. Apparatus for producing threads of rubber and the like, comprising a reservoir of rubber-containing fluid, a carrier band, means for moving said carrier band through the fluid in the reservoir, and twisting means for receiving the deposited rubber strip from the carrier for twisting said strip into a circular thread.

4. Apparatus according to claim 3, wherein the carrier means are movable upwardly through the reservoir.

5. Apparatus according to claim 3, wherein the carrier band is an endless one and passes through a suitably packed slot in a wall of the reservoir.

6. Apparatus according to claim 3, wherein separate twisting means are provided for receiving the deposited rubber strip from each face of the carrier band.

7. Apparatus for producing threads of rubber and the like, which comprises a carrier and means for depositing a band of rubber upon said carrier, means for stripping a deposited rubber band from the carrier and twisting it into a circular thread, said twisting means consisting of a pair of oppositely-driven discs for receiving the thread between the peripheries of the discs and exerting radial clamping pressure thereon, said discs being also rotatable about the thread axis and adapted to exert tension on the strip to be twisted.

8. Apparatus according to claim 7, wherein the twisting means rotates the thread along its longitudinal axis as said thread passes through said twisting means.

9. Apparatus according to claim 7, wherein the twisting device comprises discs or rolls driven in opposite directions which exert a tension on the rubber band to be twisted and are capable of exerting a pressure on the thread to be produced.

10. A process of producing threads of rubber and the like of substantially circular cross-section in a continuous manner, which comprises passing a carrier band through a rubber containing fluid, withdrawing the rubber strip deposited on the band and subjecting said strip to a twisting operation to form the thread.

11. A process according to claim 10, wherein the rubber band produced upon the carrier is twisted by rotation about a longitudinal axis accompanied by radial clamping pressure.

12. A process according to claim 10, wherein the twisting of the rubber band is carried out under tension.

13. A process according to claim 10, wherein the rubber band is twisted while it is in a still wet or tacky condition so that the spirals of the twisted thread sufficiently adhere to one another.

14. A process according to claim 10, wherein the rubber band after being formed into a thread is finally dried and vulcanized.

15. A process according to claim 10, wherein the carrier band after having the rubber deposited thereon, is moved in a substantially vertical direction out of the rubber-containing fluid.

16. A process according to claim 10, wherein the carrier band, after having the rubber deposited thereon, is moved upwardly out of the rubber-containing fluid.

17. A process according to claim 10, wherein the rubber-containing fluid and the application of the rubber dispersion onto the carrier band is accelerated by the aid of the electro-cataphoretic effect.

18. A process according to claim 10, wherein the thread thickness is controlled by regulation of the speed of travel of the support.

HANS SCHÜLLER.
EMIL MATZNER.
ARMAND KAILICH.